United States Patent [19]

Travis et al.

[11] Patent Number: 5,415,363
[45] Date of Patent: May 16, 1995

[54] FILM SPOOL

[75] Inventors: Lawrence J. Travis, Kendall; Wilbert F. Janson, Jr., Shortsville, both of N.Y.

[73] Assignee: Eastman Kodak Company, Rochester, N.Y.

[21] Appl. No.: 38,741

[22] Filed: Mar. 26, 1993

[51] Int. Cl.⁶ .................................... B65H 75/18
[52] U.S. Cl. .................................... 242/611.2
[58] Field of Search ............... 242/71, 71.1, 71.8, 242/71.9, 118, 118.31, 118.32, 118.61, 118.62, 68.5, 611.2; 359/275

[56] References Cited

U.S. PATENT DOCUMENTS

| | | | |
|---|---|---|---|
| 2,110,028 | 3/1938 | Schwarz | 242/71.8 |
| 2,400,024 | 5/1946 | Roehrl | 242/71.8 |
| 2,643,072 | 6/1953 | Kugel | 242/71.8 |
| 3,066,884 | 12/1962 | Rehn | 242/118.32 |
| 3,104,848 | 9/1963 | Joffe | 242/71.8 |
| 3,106,363 | 10/1963 | Epstein | 242/68.5 |
| 3,282,527 | 11/1966 | D'Incerti | 242/71.1 |
| 3,486,709 | 12/1969 | Roberson | 242/71.8 |
| 4,338,015 | 7/1982 | Holmes | 354/275 |
| 4,682,870 | 7/1987 | Atkinson | 354/275 |
| 5,245,376 | 9/1993 | Takahashi | 242/71.1 X |

*Primary Examiner*—Daniel P. Stodola
*Assistant Examiner*—John P. Darling
*Attorney, Agent, or Firm*—Roger A. Fields

[57] ABSTRACT

A film spool comprising a hub that has a central cavity beginning with an end opening at one end of the hub, and a split spline forming a pair of spline pieces fixed inside the central cavity, is characterized in that one of the spline pieces extends closer to the end opening than the other.

5 Claims, 7 Drawing Sheets

FILM SPOOL

BACKGROUND OF THE INVENTION

1. Field of the Invention

The invention relates generally to the field of photography, and in particular to a film spool.

2. Description of the Prior Art

As is well known, 35 mm film is supplied in cassettes ready for loading into a camera. The film is stored in a strip format coiled about a spool, and the spool is rotatably supported inside a lighttight cassette shell or housing.

The spool for the film cassette is shown in FIGS. 1 and 2 of the accompanying drawings. Specifically, it comprises a cylindrical hub or core 1 having a central cavity 3 which begins with an end opening 5 at one end 7 of the hub, and a split spline 9 forming a coplanar pair of identical spline pieces 11 and 13 fixed inside the central cavity 3. The two spline pieces 11 and 13 have respective flat ends 15 and 17 equally spaced from the end opening 5. See FIG. 1.

When the cassette is loaded into a camera, a rewind spindle comprising two depending prongs is intended to be inserted through the end opening 5 into the central cavity 3. As is the custom, the two spline pieces 11 and 13 are each received in a gap between the two prongs to rotationally couple the spindle and the hub 1.

Problems to be Solved by the Invention

One possible problem that can occur during insertion of the two prongs through the end opening 5 into the central cavity 3 is that respective pointed tips of the two prongs may each abut the flat ends 15 and 17 of the spline pieces 11 and 13 because the flat ends are equally spaced from the end opening 5. If the spindle is then rotated, the pointed tips of the two prongs might not be able to slip off the flat ends 15 and 17 due to the frictional relationship between the pointed tips and the flat ends. This will prevent the spline pieces 11 and 13 from being received in the gap between the two prongs to rotationally couple the spindle and the hub 1.

Another possible problem that can occur during insertion of the two prongs through the end opening 5 into the central cavity 3 is that the pointed tips of the two prongs may both be received in one of two cavity-halves 19 and 21, i.e. one side, of the central cavity 3. See FIG. 2. If the spindle is then rotated, either one of the pointed tips of the two prongs might not be able to hop over one of the flat ends 15 and 17 of the spline pieces 11 and 13 because the flat ends are equally spaced from the end opening 5. See FIG. 1. This will prevent the spline pieces 11 and 13 from being received in the gap between the two prongs to rotationally couple the spindle and the hub 1.

SUMMARY OF THE INVENTION

According to the invention, a film spool comprising a hub that has a central cavity beginning with an end opening at one end of the hub, and a split spline forming a pair of spline pieces fixed inside the central cavity, is characterized in that:

one of the spline pieces extends closer to the end opening than the other.

Advantageous Effects of the Invention

Since one of the spline pieces is closer to the end opening than the other, one of the pointed tips of the two prongs may abut a flat end of the closer spline piece when the two prongs are inserted through the end opening into the central cavity, but the other pointed tip will be spaced from a flat end of the spline piece that is farther from the end opening. If the spindle is then rotated, the pointed tip that abuts the flat end can slip off the flat end more easily than when the pointed tips both abut the flat ends as in the prior art. Thus, it is more likely that the spline pieces will be received in the gap between the two prongs to rotationally couple the spindle and the hub.

Also, should the pointed tips of the two prongs be received in one of two cavity-halves of the central cavity during insertion of the two prongs through the end opening into the central cavity, one of the pointed tips will be able to hop over the flat end of the spline piece that is farther from the end opening when the spindle is rotated. Thus, the spline pieces can be received in the gap between the two prongs to rotationally couple the spindle and the hub.

DETAILED DESCRIPTION OF THE PREFERRED EMBODIMENT

The invention is disclosed as being embodied preferably in a 35 mm cassette. Because this type cassette is generally well known, the description which follows is directed in particular to elements forming part of or cooperating directly with the invention. It is to be understood, however, that elements not specifically shown or described may take various forms known to a person of ordinary skill in the art.

Figure 1:
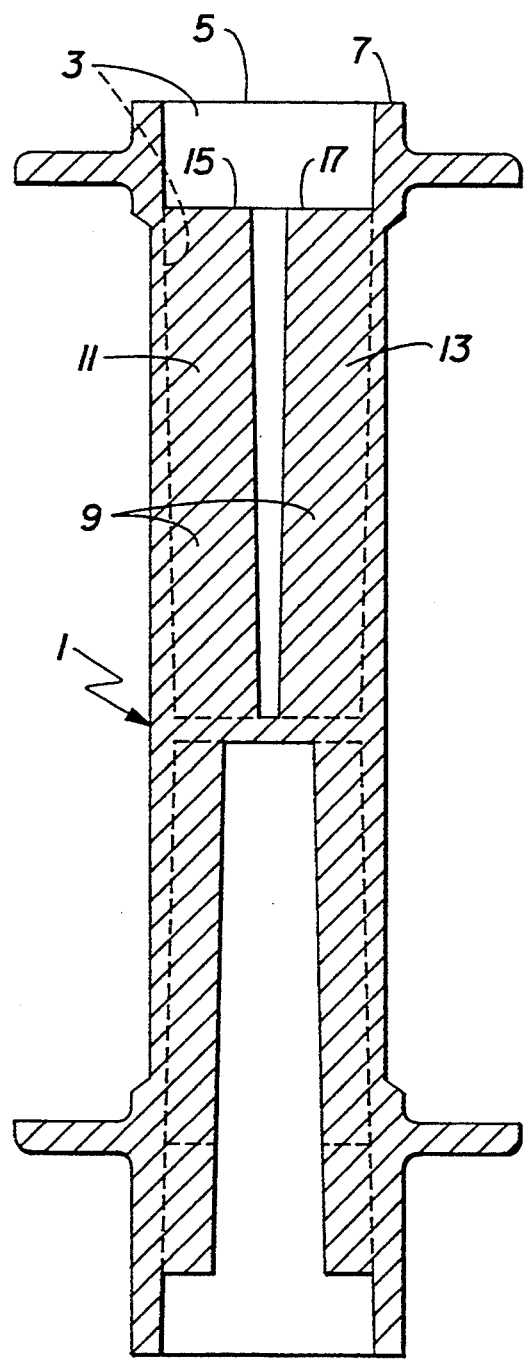
FIG. 1 is an elevation section view of a film spool known in the prior art.
Figure 2:
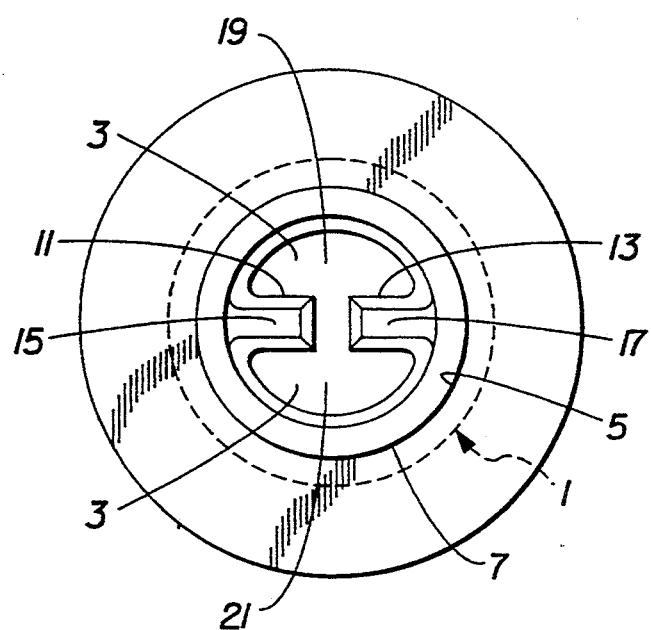
FIG. 2 is a top end view of the film spool depicted in FIG. 1.
Figure 3:
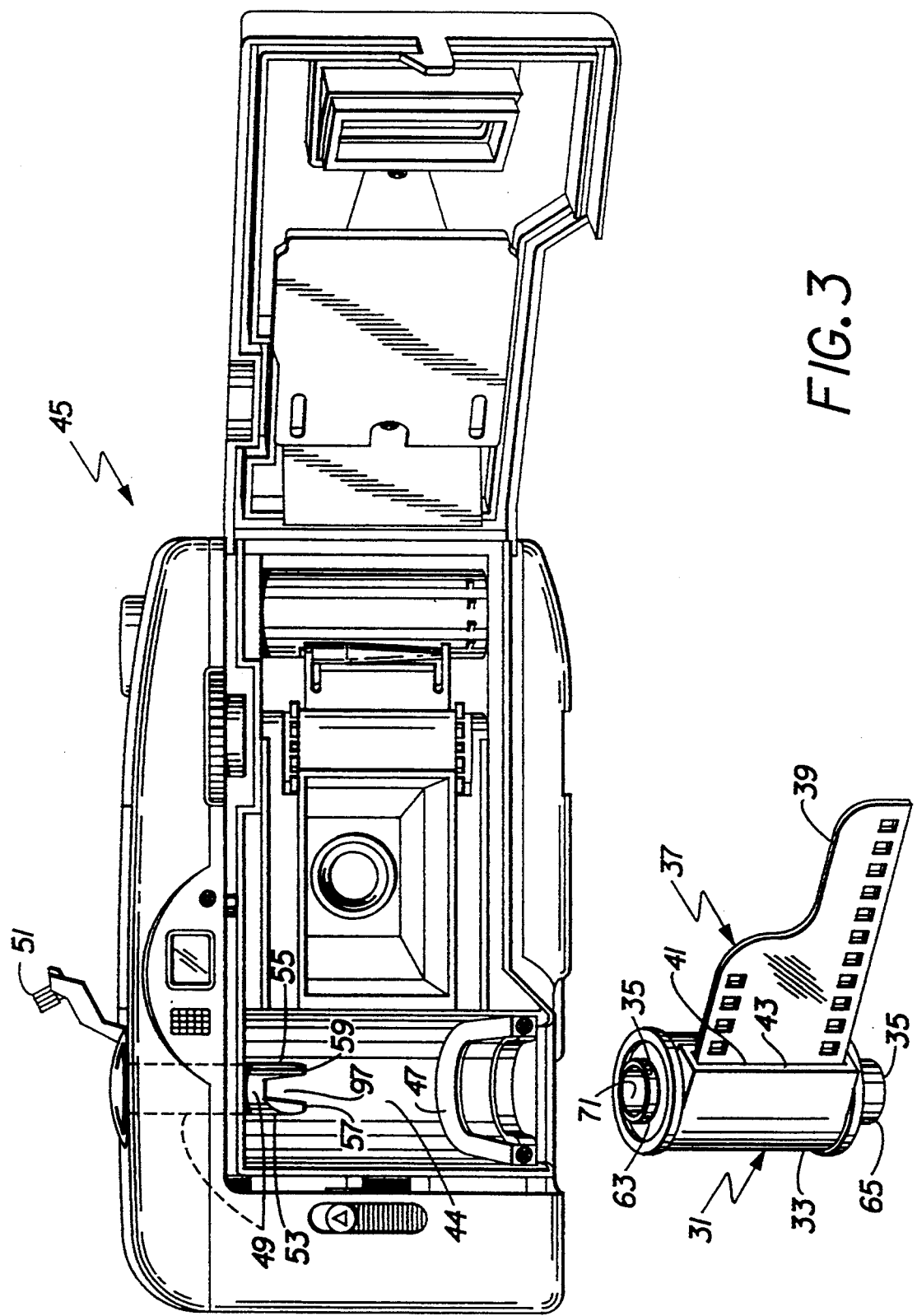
FIG. 3 is a perspective view of a 35 mm cassette and a camera into which the cassette is intended to be loaded.
Figure 4:
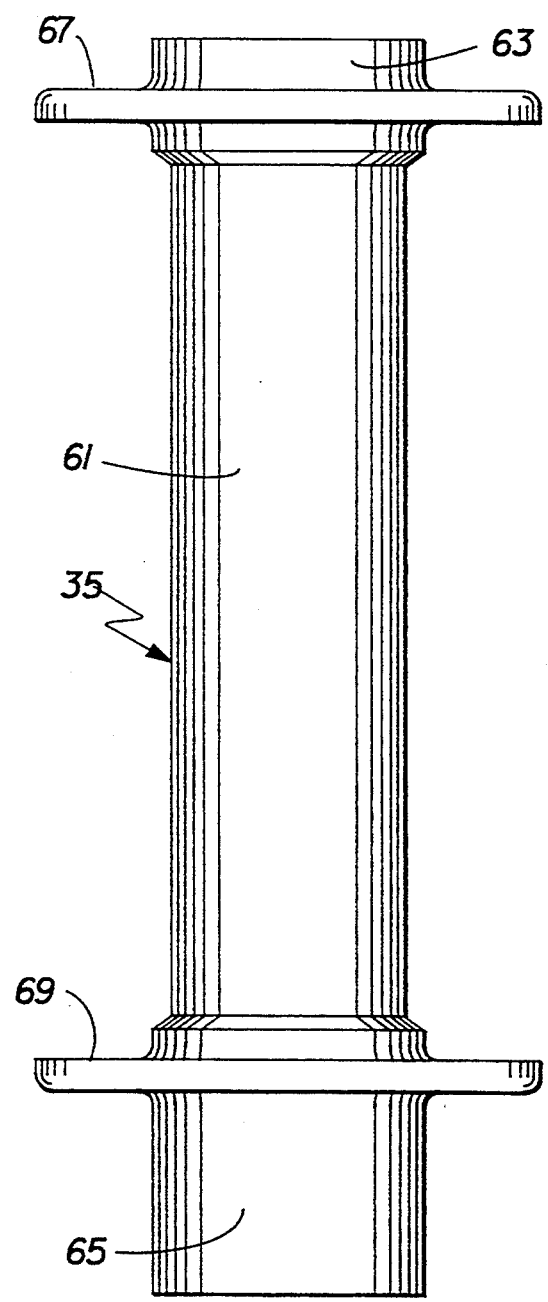
FIG. 4 is an elevation peripheral view of a film spool rotatably supported inside the cassette shell, according to a preferred embodiment of the invention.

Referring now to the drawings, FIG. 3 shows a 35 mm cassette 31 comprising a lighttight cassette shell or housing 33 containing a rotatably supported spool 35 on which is wound an edge-perforated filmstrip 37. A leader section 39 of the filmstrip 37 longitudinally protrudes outwardly from a light-trapping slit 41 in mouth portion 43 of the shell 33.

The film cassette 31 is intended to be loaded into a loading or supply chamber 44 of a known camera 45. See FIG. 3. The camera 45 includes a ribbon spring 47 and a rewind spindle 49 each located in the loading chamber 44. The ribbon spring 47 is intended to secure the film cassette 31 in the chamber 44. The rewind spindle 49 is intended to engage the film spool 35 of the film cassette 31 to rewind the filmstrip 37 (including its leader section 39) into the cassette shell 33, and is coaxially connected to a manual rewind knob 51 for this purpose. As shown in FIG. 3, the rewind spindle 49 includes two depending identical prongs 53 and 55 having respective pointed ends 57 and 59 which facilitate engagement of the spindle with the film spool 35.

The film spool 35 comprises a cylindrical hub or core 61 having a shorter end 63 and a longer end 65, and a pair of identical coaxially-spaced flanges 67 and 69, shown in FIGS. 3-7. At the shorter end 63 of the hub 61 there is provided an end opening 71 to a central cavity 73 in the hub. See FIG. 7. At the longer end 65 of the hub 61 there is provided an end opening 75 to a central cavity 77 in the hub. A split spline 79 forming a coplanar pair of spline pieces 81 and 83 with respective flat ends 85 and 87 is fixed inside the central cavity 73. Similarly, two coplanar spline pieces 89 and 91 with respective flat ends 93 and 95 are located in the central cavity 77. The flat ends 93 and 95 of the two spline pieces 89 and 91 are equally spaced from the end opening 75 as in the prior art. However, in accordance with the invention, the flat end 87 of the spline piece 83 is located farther from the end opening 71 than the flat end 85 of the spline piece 81.

Since the flat end 85 of the spline piece 81 is closer to the end opening 71 than the flat end 87 of the spline piece 83, one of the pointed tips 57 or 59 of the two prongs 53 and 55 of the rewind spindle 49 may abut the (closer) flat end 85 when the two prongs are inserted through the end opening into the central cavity 73, but the other pointed tip will be spaced from the (farther) flat end 87. If the spindle 49 is then rotated, the pointed tip 57 or 59 that abuts the flat end 85 can slip off the flat end more easily than when the pointed tips both abut the flat ends as in the prior art. Thus, it is more likely that the spline pieces 81 and 83 will be received in a gap 97 between the two prongs 53 and 55 to rotationally couple the spindle and the hub 61.

Figure 5:
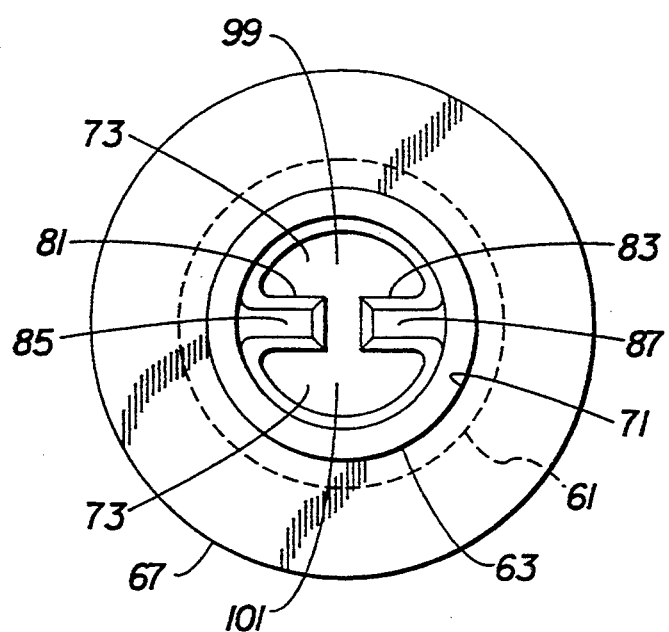
FIG. 5 is a top end view of the film spool depicted in FIG. 4.
Figure 6:
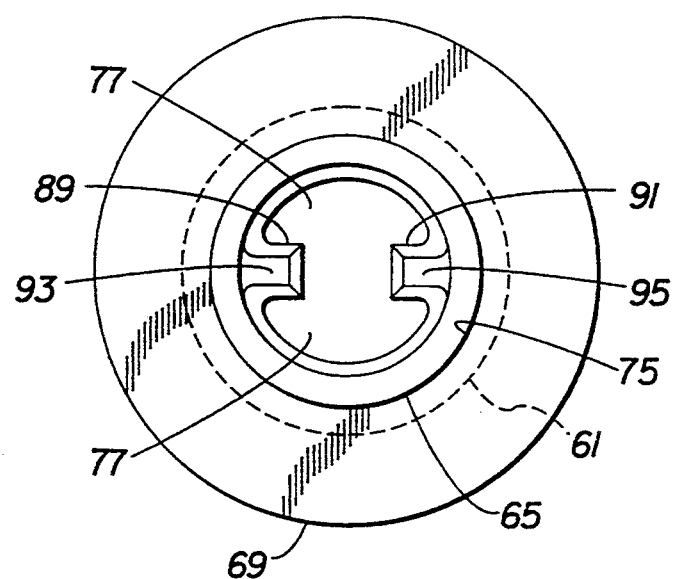
FIG. 6 is a bottom end view of the film spool depicted in FIG. 4.
Figure 7:
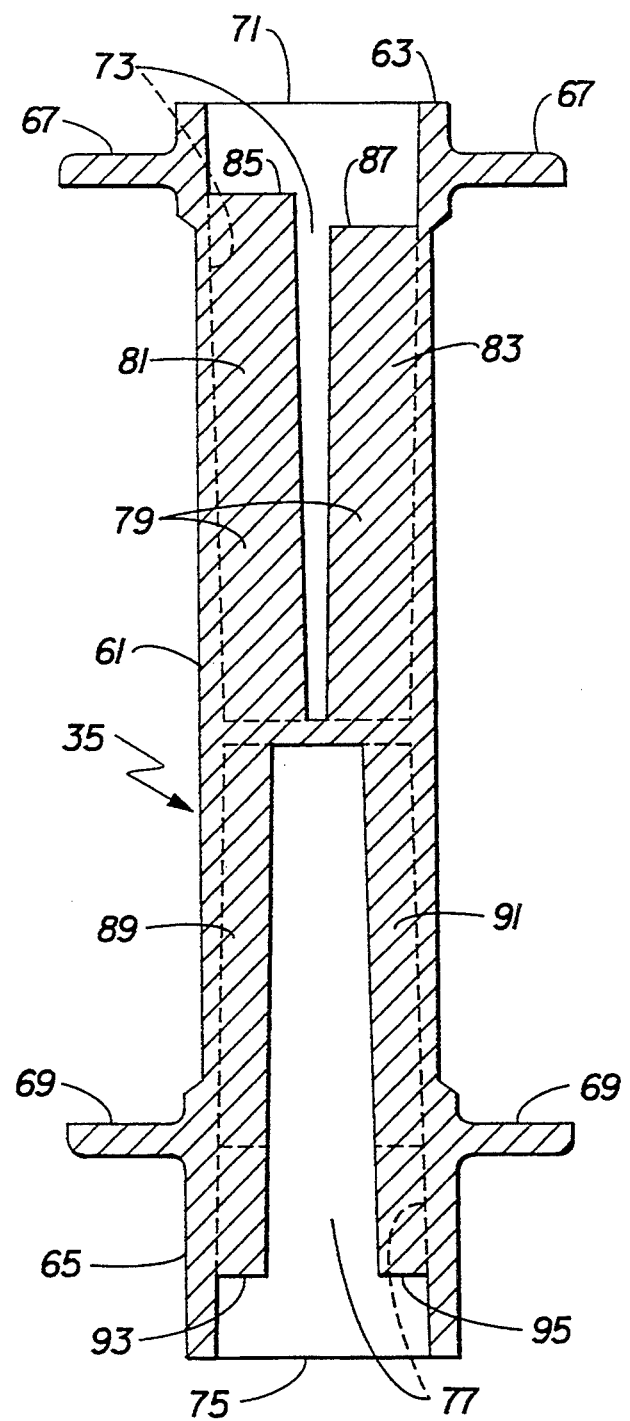
FIG. 7 is an elevation section view of the film spool depicted in FIG. 4.

Also, should the pointed tips 57 and 59 of the two prongs 53 and 55 of the rewind spindle 49 be received in one of two cavity-halves 99 and 101 of the central cavity 73, shown in FIG. 5, during insertion of the two prongs through the end opening 71 into the central cavity, one of the pointed tips will be able to hop over the (farther) flat end 87 when the spindle 49 is rotated. Thus, the spline pieces 81 and 83 can be received in the gap 97 between the two prongs 53 and 55 to rotationally couple the spindle 49 and the hub 61.

The invention has been described in detail with reference to a preferred embodiment. However, it will be appreciated that variations and modifications can be effected by a person of ordinary skill in the art without departing from the scope of the invention. For example, the spline 79 need not be split. However, its end 87 would still be located farther from the end opening 71 than its end 85.

Parts List for FIGS. 1-7

1. hub or core
3. central cavity
5. end opening
7. hub end
9. split spline
11 & 13. spline pieces
15 & 17. flat ends
19 & 21. cavity-halves
31. film cassette
33. cassette shell
35. spool
37. filmstrip
39. leader section
41. light-trapping slit
43. mouth portion
44. loading chamber
45. camera
47. ribbon spring
49. rewind spindle
51. rewind knob
53 & 55. prongs
57 & 59. pointed ends
61. spool hub
63 & 65. shorter and longer hub ends
67 & 69. spool flanges
71. hub end opening
73. hub end cavity
75. hub end opening
77. hub end cavity
79. split spline
81 & 83. spline pieces
85 & 87. flat ends
89 & 91. spline pieces
93 & 95. flat ends
97. gap
99 & 101. cavity-halves

We claim:

1. A film spool comprising a hub that has a central cavity beginning with an end opening at one end of said hub, and a split spline forming a coplanar pair of spaced first and second splines fixed inside said central cavity, is characterized in that:
   one of said coplanar splines extends closer to said end opening than the other.

2. A film spool as recited in claim 1, wherein said hub has a shorter end and a longer end, and said end opening is at said shorter end.

3. A film spool as recited in claim 2, wherein said hub has a second cavity beginning with an end opening at said longer end, and a pair of spline pieces fixed inside said second cavity and equally spaced from said end opening of the second cavity.

4. A film spool comprising a hub that has a central cavity beginning with an end opening at one end of said hub, and a spline having a pair of substantially identical flat ends located at said central cavity, is characterized in that:
   one of said substantially identical flat ends of said spline extends closer to said end opening than the other, the one flat end that is not closer to the end opening faces the end opening.

5. A lighttight film cassette comprising a cassette shell containing a rotatably supported film spool having a hub with a central cavity beginning with an end opening at one end of said hub and a spline having a pair of substantially identical flat ends located at said central cavity, is characterized in that:
   one of said substantially identical flat ends of said spline extends closer to said end opening than the other, the one flat end that is not closer to the end opening faces the end opening.

* * * * *